Figure 1:
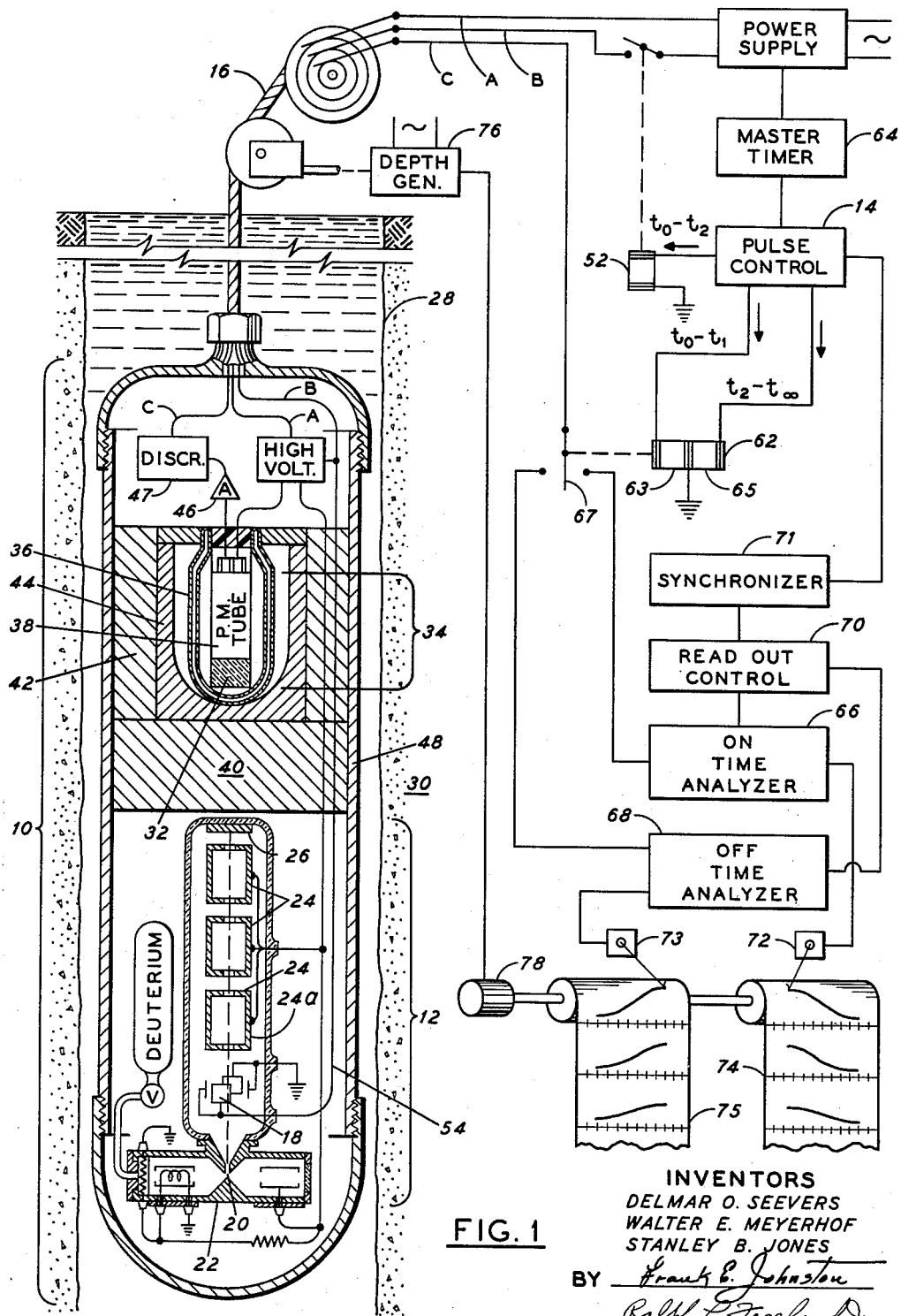

INVENTORS
DELMAR O. SEEVERS
WALTER E. MEYERHOF
STANLEY B. JONES
BY Frank E. Johnston
Ralph L. Freeland Jr.
ATTORNEYS

INVENTORS
DELMAR O. SEEVERS
WALTER E. MEYERHOF
STANLEY B. JONES
BY
ATTORNEYS

May 12, 1964  S. B. JONES ETAL  3,133,195
NEUTRON SLOWING DOWN AND ABSORPTION LOGGING METHOD
Filed Dec. 5, 1958  3 Sheets-Sheet 3

INVENTORS
DELMAR O. SEEVERS
WALTER E. MEYERHOF
STANLEY B. JONES
BY
ATTORNEYS

3,133,195
NEUTRON SLOWING DOWN AND ABSORPTION LOGGING METHOD
Stanley B. Jones, Whittier, Delmar O. Seevers, Fullerton, and Walter E. Meyerhof, Menlo Park, Calif., assignors to California Research Corporation, San Francisco, Calif., a corporation of Delaware
Filed Dec. 5, 1958, Ser. No. 778,384
7 Claims. (Cl. 250—83.1)

The present invention relates to neutron well logging methods and more particularly to a method wherein fast neutron flux is cyclically or periodically varied to irradiate an earth formation traversed by a well bore to permit the measurement of time-sequentially different radiations that result when fast neutrons slow down to epithermal and thermal energies by a series of collisions or interactions with unknown nuclei in and around the well bore wherein said radiations are measured both prior to and/or following capture of said thermal neutrons by nuclei of elements in said formation.

A first object of the present invention is to measure the slowing-down time of fast neutrons, in an earth formation penetrated by a bore hole, and to thereby obtain an index of the hydrogen concentration of this formation that is largely independent of bore hole diameter and iregularities, and of source-detector spacing or other geometry of the logging tool.

A second object is to measure the absorption time of thermal neutrons in said earth formation and therefrom obtain an index of the chlorine concentrations, or the concentrations of other elements having large thermal neutron absorption cross sections, that are present either naturally or as a result of oil well treatment operations.

In a preferred method of carrying out said objects of the present invention, substantially monoenergetic fast neutrons are periodically or cyclically generated in a bore hole for a predetermined time interval in each period or cycle. Said period of generation is controlled to irradiate an earth formation penetrated by the bore hole with a substantially predictable number of fast neutrons at discrete time intervals, which slow down to produce epithermal neutrons with energies of about one electron volt and also thermal neutrons with energies of about 0.025 electron volt. The rates of both build-up and/or decay of the epithermal and thermal neutrons are measured in a time interval of known length beginning within one or two microseconds of source turn-on and within one or two microseconds of source turn-off and continuing over a time interval thereafter of about 1000 microseconds. Alternatively, the rates of both build-up and/or decay of gamma rays from thermal neutrons are measured at the beginning and at the end of a pulse. Additionally, gamma radiation associated with one or more particular kinds of unknown nuclei in the formation can be measured. By recording these build-up and decay rates for epithermal and thermal neutrons, or gamma rays resulting from thermal neutron capture, that return to the bore hole at preselected periods of time, synchronized with the time when said neutrons are generated, hydrogen concentration of the total fluid content of the formation is established, and the chlorine concentration, or the concentration of other nuclei having high thermal neutron absorption cross-sections, are ascertained.

Fast neutrons of a given initial energy from a neutron generator slow down from "fast" to "thermal" energies by a series of elastic and inelastic collisions with nuclei of a moderating and absorbing material. Each collision decreases the energy of the fast neutron. The time required for a fast neutron to slow down is entirely dependent upon its initial energy and the different nuclei comprising the material irradiated by said neutron.

However, measurement of the build-up and decay rates of the epithermal neutron, thermal neutron, or neutron capture gamma ray flux at source turn-on and turn-off provides a hydrogen index. The elastic scattering process from hydrogen nuclei predominates as the slowing-down mechanism because of the nearly equal masses of the proton and neutron. The slowing-down log is more fully representative of the formation than that provided by a conventional neutron log because a time measurement is involved that is relatively free of tool geometry effects and also because source-detector spacings can be used that are more favorable to minimize hole effects. A preferred spacing for so minimizing the hole effect is to locate the detector at that distance from the source where variation in detected signal intensity is a minimum function of porosity. Ordinarily, in conventional neutron logging, the detector is placed at a sufficient distance from the source so that increasing porosity gives a weaker signal. On the other hand, if the spacing of the detector is very close to the source, increasing porosity gives a stronger signal. In one form of this invention, the detector is placed at an intermediate position that gives a minimum variation in signal strength as a function of porosity, but produces a pronounced change in the rate of build-up and decay of epithermal neutron intensity, as a function of porosity, and as a result of the changes in slowing-down times. In another form of the invention the detector is placed as close as possible to the source to obtain maximum signal intensity and hence increased accuracy in rate determinations. Gross variations in signal intensity do not in themselves influence the rate determinations.

During the first part, say 10 to 20 microseconds, of each 1000-microsecond pulse, the rate of build up or decay of thermal neutron intensities will show a change in neutron-slowing-down time that is dependent upon porosity. On the other hand, the remaining portion of each pulse, say 990 or 980 microseconds, is entirely determined by thermal neutron absorption processes. Thermal neutron absorption, as measured by build-up and decay rates of thermal neutron flux at source turn-on and turn-off after the first few microseconds, is largely a measure of chlorine concentration in the formation due to the very large cross-section of chlorine for thermal neutrons. Rates of build-up or decay of thermal neutron flux intensity can be measured directly for this purpose, or the rate of build-up, or decay, of the intensity of the characteristic and specific gamma rays from thermal neutron capture of chlorine or other highly absorbent nuclei can be measured.

In a further refined form of this invention, when thermal neutron capture gamma rays are measured, those arising from capture by hydrogen are eliminated by enegy discrimination to minimize the effect of those neutrons slowed down primarily in the drilling fluid.

With borehole generators of the type under consideration, one of the most difficult problems is to maintain stability in the output of the generator. This instability results from fluctuations in voltage potentials on the various electrical elements of the generator due to changes in the power supply and in thermal conditions under which it must operate. Accordingly, it has been found that where the generator is operated on substantially a constant output basis (similar to D.C. operation of an electrical generator), the resulting log of nuclear events occurring in an earth formation more nearly reflects variations in generator output than the individual nuclear events that occur in the earth formation. Even if the generator is modulated at a relatively low rate, as is common practice for any neutron generator to prevent overheating of the target producing neutrons, the same fluctuations are measured in the nuclear events detected in the neutron or gamma ray detection system. In accordance with an important aspect of the present invention, much of this difficulty is overcome by modulating the neutron output at a relatively high rate, that is, at the rate of about 500 cycles per second (1000 microseconds on; 1000 microseconds off). With this frequency of modulation and by measuring time dependent variables directly for each cycle, instead of number of counts of the detected nuclear events per unit time, it is possible to determine the rate of buildup or decay of epithermal neutrons, thermal neutrons, or thermal neutron capture gamma radiation virtually independent of the absolute intensity of each individual pulse of neutrons during the "on" portion of the modulation cycle. These times can be measured either during build-up processes at source turn-on or decay processes at source turn-off. Rates so determined can be increased in accuracy by averaging data over a number of cycles, whether source intensity varies from cycle to cycle in absolute amplitude or not. Thus, the time measurements are relatively independent of source intensity as well as borehole geometry.

Further objects and advantages of the present invention will become apparent from the following detailed description taken in conjunction with the accompanying drawings.

FIG. 1 illustrates a preferred embodiment of the downhole neutron generating and radiation detection means together with a time sequence recording system for successively recording the decay rates and/or build-up rates of neutrons by means of thermal neutron capture gamma rays from the formation in synchronism with the pulsing of the neutron source in a borehole.

Figure 2:
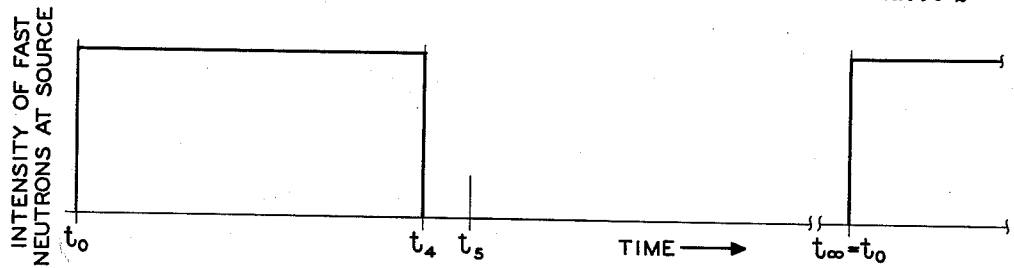
Figure 3:
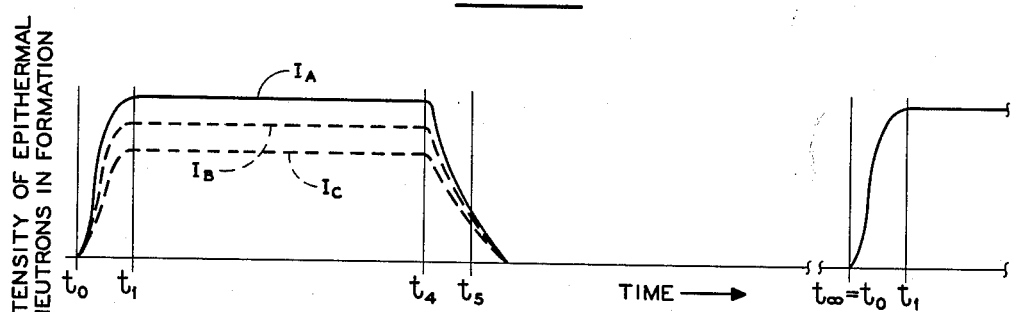
Figure 4:
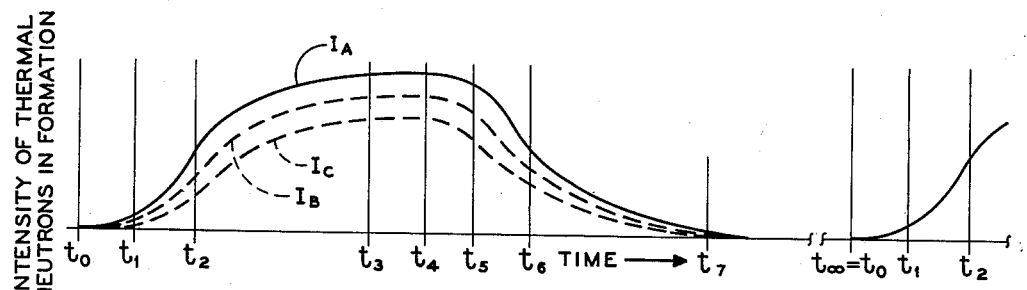
Figure 5:
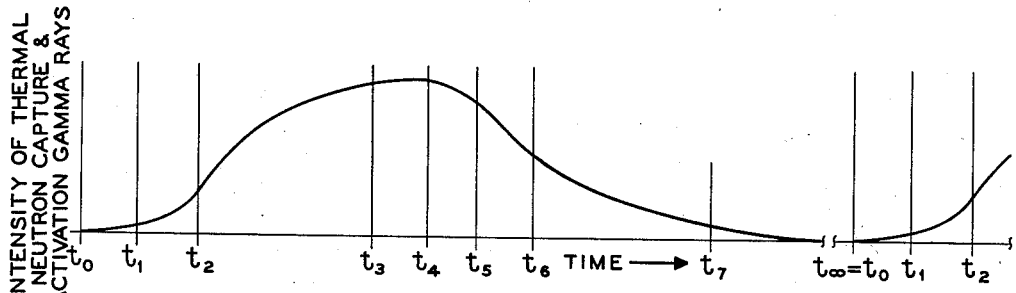

FIGS. 2 to 5, inclusive, are graphical representations, all to the same time scale, of the life cycle of fast neutrons generated by a pulsed neutron source as related to the sequential turning on and off of the source and the resulting interaction of such fast neutrons with material in and around the borehole; FIG. 2 is a plot of the intensity of fast neutrons; FIG. 3 is a plot of intensity of epithermal neutrons; FIG. 4 is a plot of the intensity of thermal neutrons; and FIG. 5 is a plot of the intensities of thermal neutron capture gamma rays, and gamma rays from induced radio-activity, of all energies produced at the detector.

Figure 6:
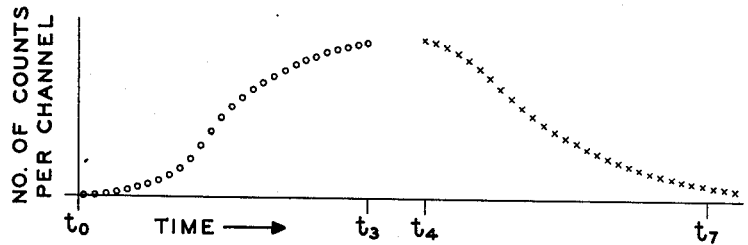
Figure 7:
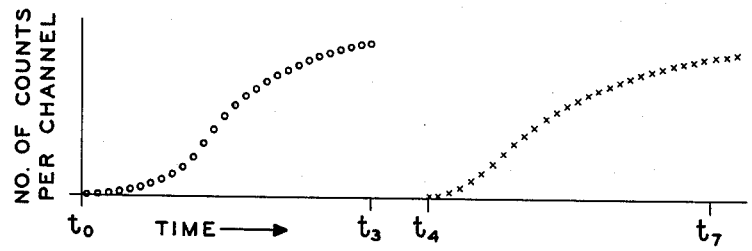
Figure 8:
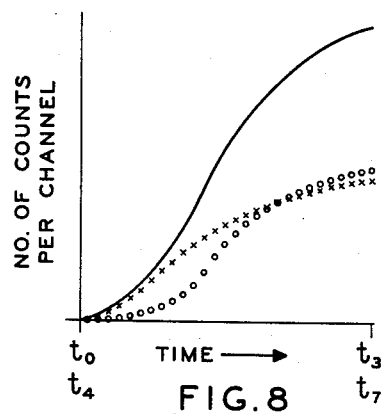

FIGS. 6 to 8, inclusive, illustrate automatic averaging, or complementing, of thermal neutron build-up and decay rate curves, as detected by thermal neutron capture gamma rays, to provide a single absorption rate; where: FIG. 6 is a plot of the record of a pulse height time analyzer; FIG. 7 is a plot of the inversion or complementing of part of the plot in FIG. 6; and FIG. 8 represents a combining or averaging of the curves of FIG. 7.

Referring now to the drawings and in particular to FIG. 1, there is shown a well logging sonde 10 that includes an electronically controllable neutron generator of the accelerator type 12. While accelerator 12 is generally illustrated as being of the deuterium-tritium type, capable of generating an intense flux of substantially mono-energetic neutrons of about 14 m.e.v., one of the essential features of said accelerator to the present invention is its ability to be pulsed at a relatively rapid rate of up to about 500 cycles per second, or higher. The pulse rate of neutron generator 12 is desirably controlled from the earth's surface, but of course a preset cycling control may be included in the logging sonde 10. In FIG. 1, the pulse control circuit, indicated by block 14, may comprise a mechanical vibrator or a sine wave generator located at the earth's surface. Through line B in logging cable 16, pulse circuit 14 controls the potential on a set of focusing plates 18 in generator 12. Plates 18 normally focus an ion beam that accelerates deuterons to strike target 26 after they leave orifice 20 in ion source 22. The beam, as indicated by the dotted line, then enters a plurality of accelerating tubes 24, but can be deflected by plates 18 so that it will not enter the iris of the first accelerating tube 24a. Thus, it will be seen that the accelerated beam of deuterons may be biased either to reach tritium target 26, or fail to reach that target, on any desired time scale.

While pulsing of a downhole neutron source has been practiced before to prevent overheating of the target and to reduce power consumption of the generator, in the present invention a relatively fast pulsing rate is used for neutron source 12 to generate individually detectable nuclear events in an environment, such as earth formation 30, containing unknown rocks and fluids. These different nuclear events result when fast neutrons are slowed down and are thermally absorbed. These nuclear events normally compete with each other and are so complex that they have not heretofore been distinguishable or even understood; hence, the use of such neutron generators has been limited to detection of the same radioactivities as can be detected by a steady-state neutron source, such as the conventional polonium-beryllium sources used in commercial radioactive logging. Pulsing, as used herein, enables generation and detection of rates of build-up and decay of epithermal neutrons, thermal neutrons, and thermal neutron capture gamma radiation. The particular embodiment illustrated in FIG. 1 is for detection of build-up and decay rates of thermal neutron capture gamma radiation. Pulsing is necessary for such rate measurements since it is the transient states of such nuclear events that reveal the identifying characteristics of the material acted upon, and the time for such transient events to occur must be measured to produce our result.

As mentioned above, logging sonde 10 is supported in well bore 28 at the end of logging cable 16 to investigate earth formation 30, wherein it is desired to know whether commercially valuable fluids, including oil and gas, are present. The identity of these fluids can be learned from the interaction of neutrons with certain nuclei therein that both slow down said neutrons and generate gamma rays of known energy. In particular, hydrogen and chlorine indices can be measured accurately for the earth formation from build-up and decay rates of the nuclear radiations to detect total fluid content and porosity of the rocks that contain these fluids. In this kind of unknown environment the fast neutrons emanating from accelerator 12 first irradiate the fluid and other materials in the well bore and then enter formation 30.

Fast neutrons, of course, interact with the drilling fluid as they pass through borehole 28. Many of these neutrons are slowed down by elastic collisions with protons, the most abundant nuclei of hydrogen. Some of the neutrons are slowed down sufficiently within the drilling fluid to generate thermal neutrons therein, and others are slowed down by both elastic and inelastic collisons with materials in the formation 30 and become epithermal and thermal there. The time required for a flux of monoenergetic fast neutrons to be thermalized (slowing-down time) together with the subsequent time required for a thermal neutron flux to become absorbed (thermal neutron absorption time) is influenced by both the initial fast neutron energy and the types of nuclei, in and around the source, interacting with the neutrons. In this embodiment of FIG. 1, these time-energy relationships are measured in conjunction with the time of pulsing the source to separately identify the gamma radiation available for detection by crystal 32 in scintillation detector 34. In this preferred embodiment shown in FIG. 1, the influence of the drilling fluid can be minimized by rejecting from the measured gamma radiation all gamma radiation of energy less than 3.0 m.e.v. because the gamma radiation from drilling fluid is primarily that from neutron capture by hydrogen having an energy of 2.23 m.e.v.

Specifically, it is desirable to measure the rates of buildup and decay of the epithermal and thermal neutrons and thermal neutron capture gamma rays during selected portions of each neutron irradiation pulse. In the embodiment of FIG. 1, a single crystal 32 is positioned to receive all gamma rays arising from the environment that is irradiated by fast neutrons which are slowed down by collisions, both elastic and inelastic, to become thermal. As indicated, crystal 32 and photomultiplier tube 38 are, of course, thermally shielded from borehole temperatures by being positioned in a Dewar flask 36. Scintillation detector 34 is shielded from neutron source 12 by an arrangement such as that disclosed in Jones and Meyerhof application Serial No. 395,744, filed December 2, 1953, which issued to U.S. Patent 2,888,568 on May 26, 1959. As there disclosed, the shielding between source 12 and scintillation detector 34 is desirably bismuth and extends as block 40 completely across the space in sonde 10. Cylindrical shield 42 around the detector is also formed of bismuth. As described in said application, the bismuth shielding permits fast, epithermal and thermal neutrons to traverse the shield, but essentially prevents generation of neutron-capture gamma rays in the shield material itself due to the small cross-section of bismuth for thermal neutron capture. Another shield 44 completely surrounds the scintillation detector and is desirably formed of a boron compound capable of absorbing thermal neutrons that would otherwise reach crystal 32. Boron has an extremely large cross-section for capturing thermal neutrons but emits only low-energy gamma rays of about ½ m.e.v. in energy. These can be screened from the recording system by setting amplifier 46 to reject all pulses generated by scintillation detector 34 below a predetermined value, or by using a thin bismuth cylinder within the boron cylinder. As indicated in the present arrangement, bias is applied by discriminator 47 between the output of linear amplifier 46 and recording line C of logging cable 16.

For a better understanding of both the purpose and the operation of our time sequential, neutron irradiating and recording system comprehended by the present invention, reference is now made to FIGS. 2 to 5, inclusive. When fast neutrons sequentially collide with nuclei in and about the well bore, they are slowed down to thermal energies and then absorbed in nuclei within the borehole and unknown formation 30. As illustrated on a time scale in FIG. 2, a given flux of fast neutrons from the accelerator target starts at a time indicated as $t_0$, which for the present purpose is the start of one "on" cycle of neutron generator 12. In the arrangement of FIG. 1, this is the time when pulse control circuit 14 operates relay 52 to close contact 54 in line B. The added potential to line 54 centers the ion beam to pass through deflection plates 18 in generator 12 so that deuterons are successively accelerated by tubes 24 to strike target plate 26 with a known energy. As indicated in FIG. 2, the change in fast neutron intensity is substantially instantaneous and is indicated as beginning at time=$t_0$. This fast neutron flux density will persist for the full "on" cycle, $t_0$ to $t_4$, and in the present instance is indicated to be about one millisecond; this pulse length, together with an off-time of one millisecond, corresponds to a pulsing cycle of 500 times per second. The end of the "on" cycle is indicated as time $t_4$, at which time the fast neutron intensity decays essentially instantaneously to 0.

In FIG. 3, the epithermal neutron flux resulting from the slowing down of fast neutrons is plotted in the rock formation. It builds up and decays, respectively, at source turn-on $t_0$ and source turn-off $t_4$. These discrete time periods are designated respectively as $t_0$ to $t_1$ and $t_4$ to $t_5$ and are of the order of a microsecond; these periods correspond to the times required for fast neutrons in and around a well bore to reach epithermal energies. This time, of course, will depend somewhat upon the environment in which the fast neutron flux finds itself and in particular on the hydrogen concentration. The remainder of the "off" cycle is indicated as the time from $t_3$ to $t_\infty$. For the present purposes, $t_\infty$ is a period of less than 10 milliseconds.

FIG. 3 graphically illustrates the manner in which the fast neutron flux shown in FIG. 2 is slowed down to epithermal energies and specifically represents the "life cycle" of epithermal neutrons in earth formation 30 after irradiation by fast neutrons. Since the population of epithermal neutrons is directly dependent upon the fast neutron flux, the emission intensity of neutron source 12 controls the epithermal neutron intensity. The origin time in each cycle for epithermal neutrons is also $t_0$. However, the build-up time for the epithermal neutron flux in each cycle is a direct function of the type of nuclei in the material within and around the well bore. Specifically, the slope of the build-up curve from time $t_0$ to $t_1$, as shown in FIG. 3, is the reciprocal of the slowing-down time and depends upon the scattering of fast neutrons by such material; the primary moderators for fast neutrons are protons, hydrogen nuclei. The slowing-down time is directly proportional to the rate of production of epithermal neutrons in this environment. The flux density of epithermal neutrons reaches an equilibrium, or saturation value, that is generally determined by the flux density of the generated fast neutrons. This value is reached at a time, such as $t_1$, that is independent of the total flux density of fast neutrons that are slowed down during the interval from $t_0$ to $t_1$ but is dependent upon the slowing down time. Note that in FIG. 3 the decrease in intensity in the time between turn off of the source and absorption of substantially all of the epithermal neutrons, $t_5$, can be used as an index of slowing-down time. The build-up and slowing-down, or decay, rates are essentially equal so they may either be measured separately or averaged together in various embodiments of this invention. While the absolute intensity of the epithermal neutron flux will vary in accordance with the intensity of the neutrons irradiating the formation, the slowing-down time, as determined either by the build-up rate or the decay rate, will be substantially independent of absolute intensity in the same earth formation and substantially identical. An indication of this is shown in the dashed line curves by $I_A$, $I_B$ and $I_C$ of FIG. 3, where the lower absolute intensity inputs are indicated.

While the slowing-down rate for epithermal neutrons can be measured directly as one indication of the hydrogen nuclei population in an earth formation, it is also possible, in accordance with the present invention, to obtain the same advantages of freedom from generator instability, as well as tool and borehole geometry, by direct measurements of the time rate of changes of neutron intensity for thermal neutrons returning to the borehole from the formation.

In addition, or alternatively, neutron slowing-down rate can be measured with thermal neutrons by determining the rate at which thermal neutrons are captured and generate gamma rays. Such thermalized neutrons are captured preferentially by nuclei such as chlorine after slowing down successively from fast to epithermal and then to thermal energies. This is the specific embodiment that we have illustrated in FIG. 1.

FIGS. 4 and 5, respectively, illustrate both the build-up and decay processes for thermal neutrons and for neutron-capture gamma rays. As particularly shown in FIG. 4, the time required for fast neutrons to become thermalized is longer than that for fast neutrons to become epithermal in energy. This is illustrated by the more gradual slope of the curve between $t_0$ and $t_1$ and also between $t_4$ and $t_5$ in FIG. 4 as compared to FIG. 3, both after neutron source turn-on, $t_0$, and after source turn-off, $t_4$. As indicated, the slopes in FIG. 4 are more gradual. Again, it will be noted that the absolute intensity, or flux density, of the thermal neutrons does not affect substantially the slowing-down time, as indicated by the slopes between $t_0$ and $t_1$ in FIGS. 3 and 4. The family of curves $I_A$, $I_B$ and $I_C$ indicates this in FIGS. 3 and 4. FIG. 5 is a similar diagram of intensity variations of thermal neutron capture and activation gamma rays with time. The decrease of radioactivity gamma rays beyond time $t_7$ goes more slowly than that of neutron-capture gamma rays between times $t_4$ and $t_7$, which is controlled by neutron slowing down and absorption. As indicated before, the "off" time for the generator is selected to be long as compared to the neutron "life cycle" so that time $t_\infty$ is substantially equal to $t_0$; that is, the start of the next irradiation cycle. Variation in the time for build-up or decay of thermal neutron capture gamma radiation beyond times $t_1$ and $t_5$ is primarily due to the amount of chlorine in the earth formation. Since chlorine is the most common nucleus in a well logging environment that has a large capture cross-section for thermal neutrons, the build-up and decay rates can be related almost directly to the quantity of chlorine (salt water) in the formation.

From the foregoing diagrams, it will be understood that at a pulsing rate of about 100 to 200 cycles per second, or higher, and with logging sonde 10 operating at a speed of from about 20 to 60 feet per minute, each individual portion of the earth formation can be irradiated a number of times. The accuracy of slowing-down time measurement is, of course, dependent upon the statistical sample taken and is enhanced by each succeeding cycle. At 60 feet per minute and 200 cycles per second, each vertical foot of formation along the well bore will be irradiated 200 times. At slower logging speeds or faster pulsing, the number of cycles is further increased. The preferred pulse rate is 500 cycles per second; hence each foot is sampled 500 times.

Referring back to FIG. 1, there is illustrated a simplified system for measuring the slowing-down times as derived from build-up and decay rates for thermal neutron-capture gamma rays during successive cycles of the neutron generator. Of course, it will be understood that mechanical relays, such as 52 and 62, are used merely to illustrate circuit operation, but in fact, these devices are electronic timing circuits of considerable accuracy, both as to rise time at turn-on and turn-off (less than about ±1 microsecond) and positiveness in action. However, to simplify description of the circuit, pulse control 14 operates under control of a master timer 64 that may include a multivibrator. Timer 64, together with pulse control 14, regulates within a few tenths of a microsecond the time at which the generator is turned on or off at times $t_0$ and $t_4$ in FIGS. 2 to 5. Relay 62 operates in synchronism with relay 52. Differential coils, 63 and 65, control the two positions of switch 67 so that the build-up and decay rates derived from the output of scintillation detector 34, arriving through logging cable 16 by way of conductor C, can be successively switched from time analyzer 66 to time analyzer 68. Time analyzers 66 and 68 are designed to measure the frequency of occurrence of events as a function of time after switch-on or switch-off of the neutron generator. Time analyzer 66, as indicated, is arranged to store counts of the desired type during each succeeding cycle that represent the build-up rate for thermal neutron-capture gamma rays during the period $t_0$ to $t_3$. Time analyzer 66 has a number of channels distributed in time to record events occurring in the interval from 0 to 2 microseconds, 2 to 4 microseconds, 4 to 6 microseconds, etc., according to circuitry well known in the art. From the number of counts in each channel one is able to compute build-up rate at any desired position in time. Likewise, time analyzer 68 is used to obtain the number of thermal neutron-capture gamma rays and activation gamma rays as a function of time during the period from source turn-off, $t_4$, to a later time, $t_7$, from which decay rates are computed. As indicated above, the individual counts that can be stored will be relatively small during each cycle of the neutron generator. Hence, the rate for build-up will be relatively inexact in one cycle. For this reason the counts are accumulated in the time analyzers 66 and 68 over preferably about 500 cycles, or one second. The time analyzers are synchronized precisely by synchronizer 71 at each pulse to turn on and off at particular times. Time analyzer 68 turns on at time $t_0$ and off at time $t_3$. Time analyzer 66 turns on at time $t_4$ and off at time $t_7$. After each 500 cycles, read out control 70 instructs time analyzer 66 to draw out the number of counts in each channel by means of galvanometer 72 and similarly instructs time analyzer 68 to print out its counts by means of galvanometer 73. The build-up and decay rates are then computed from the galvanometer traces as explained above. Read out control 70 then reactivates the time analyzers 66 and 68 to begin the next counting period. As is conventional, paper strips 74 and 75 are driven in synchronism with the depth of logging sonde 10 in a well bore by an electrical signal produced by depth generator 76 to feed drive motor 78.

Recorders 72 and 73, in the embodiment of FIG. 1, present separate build-up and decay rate curves that are both complementary and inverted relative to each other. These curves can be interpreted directly to determine such information as density or porosity of the associated earth formation. Alternatively, the curves can be combined optically, as by photography, to average the values of the substantially identical build-up and decay rate curves. FIGS. 6, 7 and 8 illustrate the automatic, or electronic, averaging of these curves to present a single neutron slowdown rate curve with improved statistical accuracy.

Referring now to FIG. 6, there is shown a plot of the number of discrete counts recorded in each channel of a multiple-channel time analyzer, such as 66 or 68 in FIG. 1, against time as related to the beginning of each neutron irradiation cycle. In this plot, the channel number (sequentially) is proportional to time of detection, and the number of counts in each channel is proportional to radiation intensity of the detected quantities. The small circles represent, then, the build-up rate curve from the time $t_0$ to $t_3$ for thermal neutron capture gamma rays, if the system of FIG. 1 is used, or the build-up rates of epithermal or thermal neutrons directly, if the other detecting systems are used. In FIG. 6, the X's represent the corresponding decay rates from time $t_4$ to $t_7$.

FIG. 7 is similar to FIG. 6, except that the decay rate curve (X's) has been inverted, or complemented, and the zero or base line shifted upward to coincide with the base line of the build-up rate curve.

FIG. 8 then shows a further shift of the decay rate curve along the time axis so that the build-up and decay rate curves can be made coincident. The combined or averaged curve is then formed by simple arithmetical addition of the two curves.

Each of the functions illustrated by FIGS. 6 to 8 can be performed by circuits well known in the art that are connected between the outputs of time analyzers 66 and 68 and a single recorder, such as either 72 or 73, which will print out the averaged neutron slowing-down and absorption build-up and decay rate curves in accordance with the depth of the earth formation wherein such reactions are occurring.

As indicated above, the arrangement of the detection system of FIG. 1 is particularly adapted to measure thermal neutron-capture gamma rays. However, under certain circumstances, it is more desirable to measure slowing-down time by measuring the build-up or decay rates for epithermal neutrons or thermal neutrons directly. Rate curve slopes for epithermal neutrons of the type illustrated in FIG. 3 or those for thermal neutron flux as indicated by the curve in FIG. 4 can be so used.

In each form of recording slowing-down times, a scintillation detector is used that has a response time of the order of one-quarter microsecond or less. Such fast detectors are particularly required in order to follow accurately the rapid build-up and decay rates of the intensity of nuclear reactions that are associated with the slowing of fast neutrons. Where epithermal neutrons are detected, scintillation crystal 32 is desirably a boron-loaded plastic scintillator having a decay time of about 0.01 microsecond or less. This type of crystal is desirably protected from thermal neutrons by positioning a cadmium shield in the location indicated by shield 42 in FIG. 1, except that a relatively thin layer of cadmium approximately $\frac{1}{32}$- to $\frac{1}{16}$-inch thick is used. With such a shield, bismuth is substituted for boron shield 44. The bismuth shield around scintillation crystal 32 reduces the intensity of neutron-capture gamma rays within the crystal resulting from capture of thermal neutrons by cadmium. With a boron-loaded plastic crystal 32, high counting rates are achieved because the pulse length for each detected nuclear event is less than 0.01 microsecond. Further, when the detecting system is arranged to count epithermal neutrons, amplifier 46 and discriminator 47 are adjusted so that only pulses from alpha-particle emission resulting from capture of neutrons by boron in the scintillator are counted; all gamma ray pulses are eliminated by virtue of their lower pulse height. It will also be apparent that when epithermal neutrons are detected, time analyzers 66 and 68 desirably are adjusted to detect only during the periods from $t_0$ to $t_1$ and $t_4$ to $t_5$, respectively.

An alternate crystal that can be used in place of boron-loaded plastic is a lithium iodide crystal (thallium-activated). These crystals can either be solids or formed of ground particles bound in a transparent organic liquid or solid. Lithium iodide crystals should be shielded with cadmium and bismuth in the same manner as outlined above.

From the foregoing description, it will be apparent that measurement of slowing-down time has two major advantages over present neutron logging practice for measurement of fluid content. In present practice, intensities of gamma rays or neutrons in equilibrium with a steady state source are measured at a fixed distance from the source. The instrument or logger must be calibrated empirically. If the instrument design is changed, for example if the source-detector spacing is changed, then the instrument must be recalibrated entirely. On the other hand, measurement of slowing-down time introduces time as the quantity measured rather than radiation intensity; that is, a rate of change in time is measured rather than the total quantity itself. Hence, the measurement becomes absolute in character rather than relative. For example, as discussed before, slowing-down time is largely independent of source-detector spacing, whereas the intensity of radiation is highly dependent on this spacing. In fact, the change in radiation intensity produced by a change in formation porosity reverses algebraic sign as the source-detector spacing is decreased from a very large value to a very small value. Furthermore, the slowing-down time in the earth formation itself is independent of borehole diameter, whereas the conventional types of neutron logging are highly sensitive to changes in hole diameter. Further, the neutron slowing-down time measurement can be restricted to that of the earth formation, and not of the borehole fluids, by using energy discrimination to reject gamma rays emanating from elements in the drilling fluid and recording the rate of change of a signal originating from elements predominantly found only within the earth formation. For example, rejecting gamma rays from thermal neutron capture by hydrogen by discriminating against all gamma rays of energy lower than 3 m.e.v. gives one mainly radiation exterior to the borehole because elements in the earth formation generally emit gamma rays of higher energy than 3 m.e.v.; whereas hydrogen comprises most of the neutron-capturing nuclei in the borehole and emits thermal neutron-capture gamma rays of only 2.23 m.e.v.

Since rates of change of nuclear flux are measured, rather than flux intensities themselves, changes in borehole diameter, that grossly offset signal intensity, are of diminished importance.

We claim:
1. Apparatus for measuring the epithermal neutron build-up and decay rate in an earth formation traversed by a well bore substantially independent of source intensity as a measure of the fluid content of said formation which comprises means for positioning a neutron generator in the well bore adjacent the earth formation whose fluid content is to be measured, means for cyclically pulsing the output of said fast neutron generator to irradiate said formation with fast neutrons, electrical circuit means synchronously operated with the pulsing of said generator for connecting an epithermal neutron detector to at least a pair of time analyzers, each of said time analyzers having a plurality of channels for recording the number of counts of a predetermined magnitude during predetermined time intervals and in sequential order, one of said time analyzers being operable during the initial portion of each cyclic pulse from said generator when the epithermal neutron build-up rate is increasing and the other of said analyzers being operable after each cyclic pulse of said generator has ended to record the rate of epithermal neutron decay in said formation, and means for recording said epithermal neutron build-up and decay rates in accordance with the depth of said neutron generator in said well bore.

2. Apparatus in accordance with claim 1 wherein said epithermal neutron detector is a boron-loaded plastic crystal, said crystal being shielded from said earth formation by a bismuth shield surrounding said crystal and a cadmium shield intermediate said bismuth shield and said earth formation and wherein only pulses corresponding to the alpha energy of epithermal neutrons interacting with boron are recorded by said time analyzers.

3. Apparatus in accordance with claim 2 wherein said crystal is lithium iodide crystal particles suspended in a transparent organic medium.

4. Apparatus for determining fluid content of an earth formation traversed by a well bore substantially independent of the spacing between a fast neutron source and a radiation detector which comprises a fast neutron generator for irradiating said earth formation and the fluid content therein, means for pulsing said neutron generator at a rate of at least 100 cycles per second, each radiation "on" cycle continuing for a period of time sufficient for thermal neutron flux to approach equilibrium in the surrounding environment, means for positioning a radiation detector at a distance from said neutron generator such that the signal intensity of radiation events detected in said detector is least affected by variations in porosity for material adjacent thereto and extending between said source and said detector, shielding means for said radiation detector to prevent direct radiation of said detector by said source, means for cyclically energizing said radiation detector to record its output in a multiple-channel time analyzer in synchronism with the initial portion of each cyclical pulsing of said generator to emit fast neutrons, means for interrupting the output from said radiation detector at a predeterminable time prior to interruption of said neutron generator, and means for recording variations in the rate of build-up of radiation intensity recorded in each of said channels of said time analyzer as a measure of the amount of fluid content in said earth formation.

5. Apparatus in accordance with claim 4 wherein between successive neutron generation and recording cycles to record the rate of build-up of said radiation events with said multiple-channel time analyzer, the decay rate of the same radiation events is recorded by means including another multiple-channel time analyzer and means for cyclically connecting said radiation detector to said other multiple-channel time analyzer in synchronism with the interruption of each "on" cycle of said neutron generator, and means for disconnecting said detector from said other analyzer prior to again initiating an "on" cycle of said neutron generator.

6. Apparatus in accordance with claim 5 wherein said build-up and decay rates of said radiation events are averaged by means for combining together the complemented counts of said multiple-channel time analyzers in a channel-by-channel addition, and means for displaying the average rates as a direct indication of the fluid content of the formation irradiated by said neutron generator.

7. The method of measuring the amount of hydrogen in earth formations traversed by a well bore substantially independent of both the spacing between a neutron source and a radiation detector and the geometry of the borehole which comprises irradiating said earth formation and the hydrogenous material contained therein with a fast neutron source, cyclically modulating the output of said neutron source to increase and decrease the flux density of fast neutrons emitted therefrom, each increase in flux density continuing over a period of time sufficient for said neutron flux to reach equilibrium with the surrounding environment and each decrease being abrupt, positioning a radiation detector a predeterminable distance from said neutron source, shielding said radiation detector from said fast neutron source to prevent fast neutrons from said source from entering said detector directly, cyclically counting the number of pulses generated in said radiation detector during each change in the flux density of fast neutrons in said formation due to modulation of said neutron generator, including measuring a first time interval required for the number of pulses to reach a predetermined number upon each increase in flux density and measuring a second time interval required for the number of pulses per unit time to decrease to a fixed number per unit time upon each decrease in flux density, and recording the average value of said first and second time intervals as a measure of the amount of hydrogenous material interacting with fast neutrons from said source.

References Cited in the file of this patent

UNITED STATES PATENTS

| | | |
|---|---|---|
| 2,769,916 | Tittle | Nov. 6, 1956 |
| 2,769,918 | Tittle | Nov. 6, 1956 |
| 2,862,106 | Scherbatskoy | Nov. 25, 1958 |
| 2,867,728 | Pollock | Jan. 6, 1959 |
| 2,991,364 | Goodman | July 4, 1961 |

FOREIGN PATENTS

| | | |
|---|---|---|
| 724,441 | Great Britain | Feb. 23, 1955 |